United States Patent [19]

Bauer

[11] 4,406,566

[45] Sep. 27, 1983

[54] LINE BORING MACHINE

[76] Inventor: Wolfgang Bauer, 19 Pine Ct., Dowling, Ontario, Canada

[21] Appl. No.: 232,300

[22] Filed: Feb. 6, 1981

[30] Foreign Application Priority Data

Feb. 6, 1980 [CA] Canada ................................. 345147

[51] Int. Cl.³ .......................... B23B 5/00; B23B 41/00
[52] U.S. Cl. .................................. 408/129; 408/132; 408/134
[58] Field of Search .................... 408/10, 11, 124, 128, 408/129, 132, 137, 103, 131, 133, 134; 82/4 C

[56] References Cited

U.S. PATENT DOCUMENTS

| 884,529 | 4/1908 | Seib et al. | 408/134 |
| 2,122,072 | 6/1938 | Rottler | 408/133 |
| 2,310,990 | 2/1943 | Osgood | 408/129 |
| 2,891,426 | 6/1959 | Martin et al. | 408/129 |
| 2,965,009 | 12/1960 | Schotthoefer | 408/129 |

FOREIGN PATENT DOCUMENTS

| 643499 | 6/1962 | Canada | 408/129 |
| 676016 | 12/1963 | Canada | 408/129 |
| 175328 | 2/1922 | United Kingdom | 408/129 |

Primary Examiner—William R. Briggs
Assistant Examiner—Thomas M. Kline

[57] ABSTRACT

Dismountable machining apparatus for use at different work site locations, and having base means releasably attachable to a workpiece, and having a collar including an opening having a predetermined central axis and having attachment means, drive housing means connecting releasably with the attachment means, and defining a central opening in registration with said central opening of said portions, so that the drive housing means may be assembled and disassembled from said base member at a work site, drive sleeve means in the drive housing incorporating a central bore, drive transmission means for the drive sleeve means, and adapted to be coupled to a power source for driving the drive sleeve, an auxiliary drive connected to the drive sleeve, and driven in unison therewith, a machining bar member slidably received within the drive sleeve whereby the machining bar member may be rotatably driven by the drive sleeve, and may be axially slid therein, and being releasable, a feed housing and a feed sleeve member for rotation therein, the feed sleeve member defining a central bore for the machining bar member therein, whereby the feed sleeve member rotates therewith, a feed connecting member extending to one side of the feed housing, a feed screw and a feed screw advancing mechanism coupled to the feed screw, and having a drive transmission coupled to the auxiliary drive.

9 Claims, 17 Drawing Figures

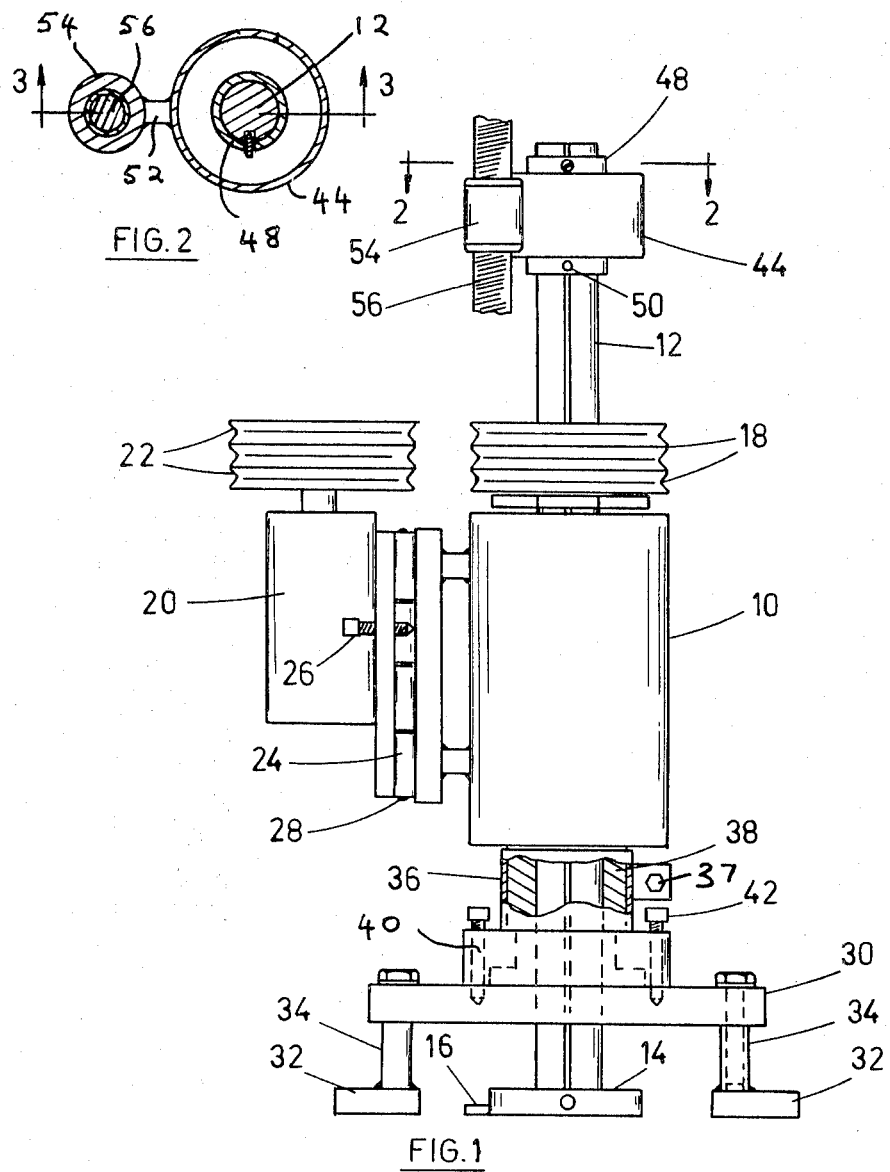
FIG. 2
FIG. 1
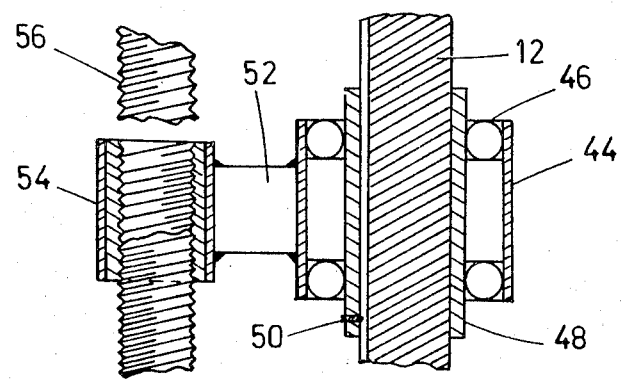
FIG. 3

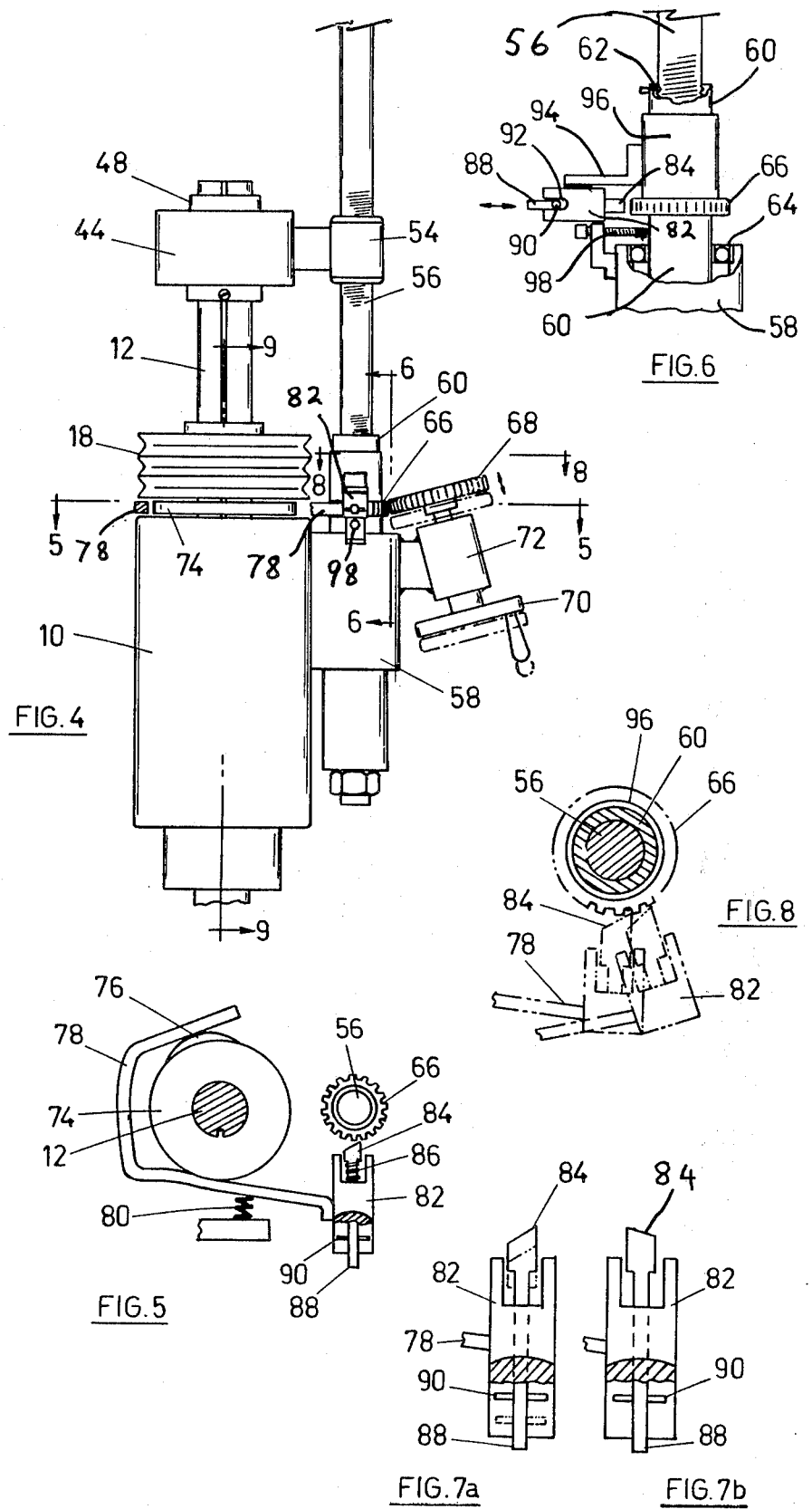

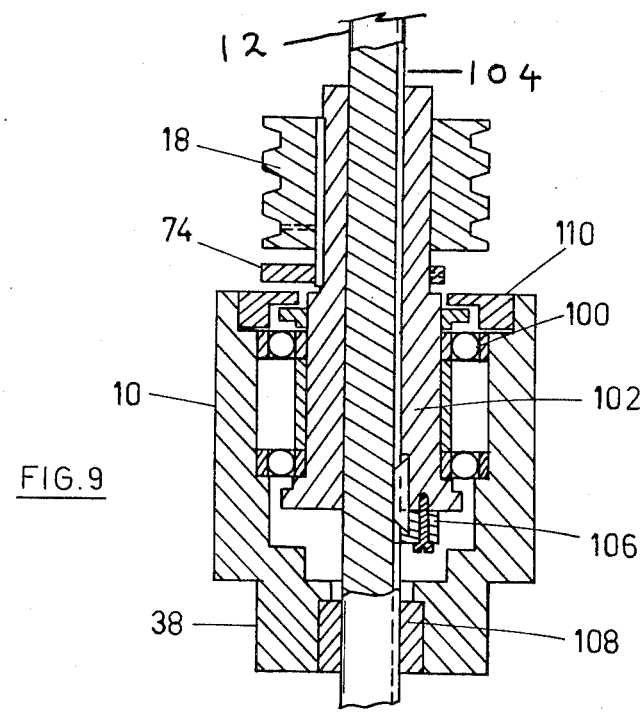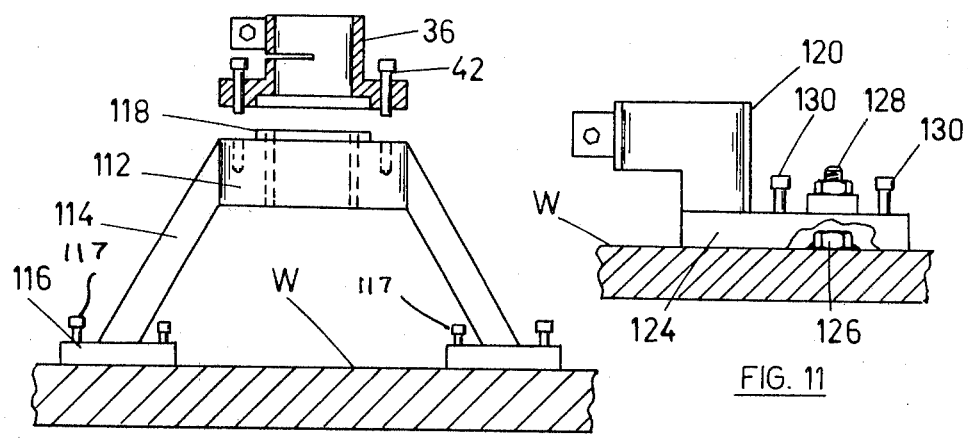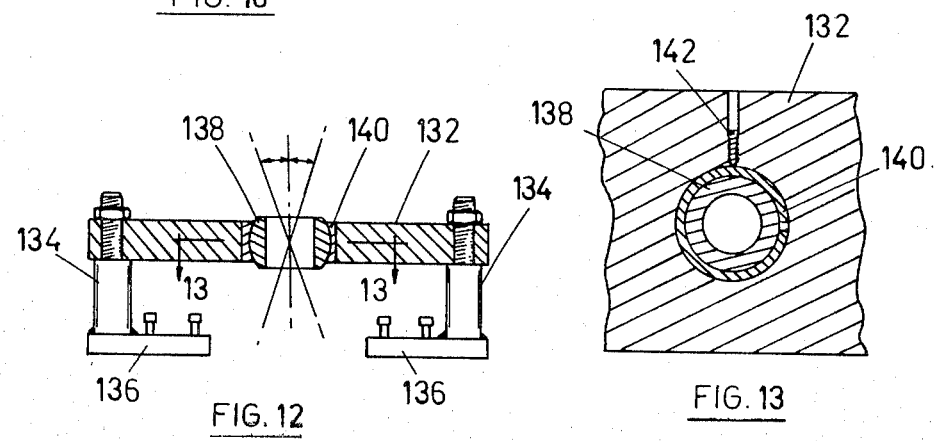

LINE BORING MACHINE

The invention relates to machining apparatus which is dismountable, for transmission to various work sites, and which, when assembled at a work site, may be used to carry out a variety of precision machining operations such as line boring, milling, and lathe work.

Precision machining of various types is usually carried out in a work shop. However, in certain circumstances it is impossible to transport a workpiece to such a work shop, and it becomes desirable to transport a portable machining apparatus to such a work site where the workpiece is located and carry out the machining operation at that location.

Examples of such on site locations are construction machinery, mining machinery, and other process machinery which may be fastened in position, or may be in need of some repair operation.

In many cases, where for example bearings or openings in such machinery become worn, it is simply not practical to transport a heavy machine or part of it to a work shop. Instead, weld metal may be used to build up the worn part, and the weld metal is then machined out to the original tolerances.

In the past, certain relatively primitive equipment has been available for the purpose, which is usually known as line boring equipment. In fact, however, the machining operations required in many cases are not simply confined to the line boring of a series of holes. Accordingly, while some of the line boring apparatus that has been available in the past has performed more or less satisfactorily for the limited purpose of line boring, it has not had the greater degree of adaptability to other machining operations. In addition, the transportation and assembly of such prior line boring equipment has been very time consuming and cumbersome, and the degree of accuracy obtained by its use has not always been as great as could be desired.

It is therefore a general objective of the present invention to provide a dismountable machining apparatus which may be transported from place to place in a series of components, and which may readily be assembled on site, for carrying out a variety of different machining operations, in a high precision manner, and then may be dismantled and removed once more.

In order to accomplish these objectives, the invention comprises a dismountable machining apparatus for the precision machining of a workpiece, said apparatus being dismountable and removable, for operation at a variety of different work site locations, said apparatus comprising, base means having at least one foot member releaseably attachable at a location for the desired machining operation, and further having a collar portion, said holder portion including an opening having a predetermined central axis and further having attachment means, drive housing means having connecting means releasably interengageable with said attachment means, and defining a through opening in registration with said central opening of said holder portion, whereby said drive housing means may be assembled and disassembled from said base member at a work site, drive sleeve means in said drive housing means, rotatably mounted therein by suitable bearing means and incorporating a central bore through said sleeve means, drive transmission means operatively connected to said drive sleeve means, and adapted to be coupled to a suitable power source for driving of said drive sleeve means, auxiliary drive means, operatively connected to said drive sleeve means, and driven in unison therewith, a machining bar member slidably received within said drive sleeve means, and driveably interengageable within said sleeve means, whereby said machining bar member may be rotatably driven by said drive sleeve means, and may be axially slid therein, and being releaseable therefrom for shipping to and from a work site, feed housing means and a feed sleeve member mounted in said feed housing means and supported by suitable bearing means for rotation therein, said feed sleeve member defining a central bore adapted to receive said machining bar member therein, and fastening means for fixing said machining bar member therein whereby said feed sleeve member rotates therewith in unison, a feed connecting member extending to one side of said feed housing means, feed screw means operatively connected with said feed connecting member and a feed screw advancing mechanism, connected to said feed screw means, and being operated by said auxiliary drive means, whereby said feed screw means may cause axial lengthwise movement of said feed housing means and thus feed of said machining bar member within said sleeve member, and tool bit mounting means adapted to receive a suitable tool bit and releaseably fastenable at one end of said machining bar member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a side elevational view of the apparatus according to the invention;

FIG. 2 is a top plan view, partially sectioned, along the line 2—2 of FIG. 1;

FIG. 3 is a section along the line 3—3 of FIG. 2;

FIG. 4 is a side elevation of a portion of the apparatus, from another direction;

FIG. 5 is a section along the line 5—5 of FIG. 4;

FIG. 6 is an enlarged side elevation of a portion of the apparatus shown in FIG. 5;

FIGS. 7a and 7b are two plan views enlarged, showing a portion of the apparatus shown in FIG. 5, in two different positions;

FIG. 8 is a further view of the same apparatus of FIG. 7, shown in two operative positions;

FIG. 9 is a section along the line 9—9 of FIG. 4;

FIG. 10 is an enlarged partially exploded view of an alternate portion of the invention;

FIG. 11 is a cutaway view of another alternate portion of the invention;

FIG. 12 is a side elevation partially in section showing a bearing and support means for the machining bar;

FIG. 13 is a section along the line 13—13 of FIG. 12;

Figure 14:
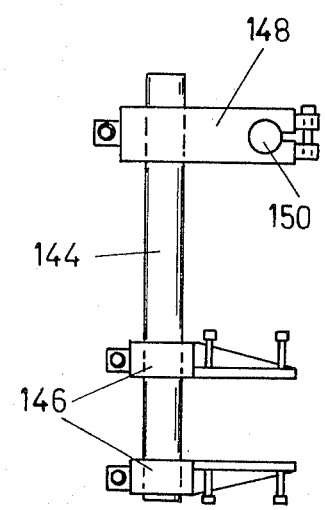
FIG. 14 is a side elevational view of another alternate form of support means.

As best shown in FIGS. 1 and 4, the line boring apparatus according to the invention comprises a main drive housing 10, an axially movable drive bar or machining bar 12, extending completely through the housing 10, and having a tool head 14 at its lower end, typically mounted with a suitable cutting tool bit 16.

By means of a suitable drive connection means (described below) mounted within drive housing 10, the bar 12 may be rotated. In order to power such drive connection means, a plurality of drive pulleys 18 are provided at the upper end of housing 10, and may be driven by a suitable drive motor for example electrical or hydraulic or the like, also provided with pulleys within drive motor 20 also provided with pulleys 22 (the drive belts being omitted for the sake of clarity). Any suitable tensioning device such as the hinge 24 and bolt 26 may be provided as necessary.

Preferably, the hinge 24 is provided with some suitable releasable means such as a removable hinge pin 28, so that the motor 20 can be removed from the drive housing 10 for ease of transportation and setting up.

At the lower end of drive housing 10, a base plate 30 is provided, having mounting feet 32 connected thereto by legs 34 by means of which the entire apparatus may be firmly fastened on a workpiece.

Suitable attachment means, for example clamps, are employed on feet 32 to fasten them to a workpiece. Many variations are possible, as is described below.

Drive housing 10 is releasably connected to the mounting plate 30 by means of a split clamping collar 36, having a bolt 37 is adapted to be clamped around a neck 38 extending downwardly from the housing 10. Collar 36 is itself releasably fastened on mounting member 30 by means of the collar base 40 and bolts 42. By suitably adjusting bolts 42, and by for example the use of shims (not shown), the collar base 40 may be fitted relative to the mounting member 30, which may be advantageous in the machining of certain items.

As shown in more detail in FIGS. 2, 3 and 4, the bar 12 may be slid axially through the housing 10, so as to advance or retract the tool holder or cutting head 14.

In order to do this, the advancing mechanism comprises a bearing housing shell 44 containing a bearing 46, which in turn carries within it a rotatable sleeve 48.

The sleeve 48 may be clamped securely to the tool bar 12 means such as, for example, the set screw 50.

The housing shell 44 is carried on an arm 56, which is in turn connected to an internally threaded sleeve 54.

The threaded sleeve 54 carries within it the threaded advancing screw shaft 56.

Rotation of the screw shaft 56 will thus move the assembly consisting of the bearing shell 44, bearing 46 and sleeve 48 axially, thereby procuring axial movement of tool bar 12, while permitting the same to rotate freely, for rotation of the cutting head 14 and tool bit 16.

Rotation of screw shaft 56 is procured by means of the assembly best shown in FIGS. 4, 5, 6, 7 and 8. It will be appreciated that in FIG. 4, the entire motor assembly 20 has been omitted for the sake of clarity.

The screw shaft drive assembly will be seen to comprise a shaft housing 58, fastened to the drive housing 10, and supporting within it a rotatable sleeve 60. Sleeve 60 is fastened or keyed to screw shaft 56 by any suitable means such as key 62, for rotation in unison, and is mounted in bearings 64 in housing 58.

A gear wheel 66 is fastened to the exterior of sleeve 60 and is releasably interengageable with the manual drive gear 68 (FIG. 4) driven by hand wheel 70. By any suitable means (not shown) hand wheel 70 and gear wheel 68 may be drawn axially through housing 72 which is itself attached to housing 58 at an angle. By moving it in the manner shown in phantom in FIG. 4, it may be disengaged from and engaged with gear 66. Manual rotation of shaft 56 will cause upward or downward movement of threaded sleeve 60 and housing 58, thereby advancing or withdrawing the tool bar 12.

Bar 12 may also be advanced or withdrawn automatically in predetermined increments, in timed relation to the rotation of tool bar 12.

This is achieved by means of the cam disc 74 mounted on tool bar 12, between pulleys 18 and housing 10. As best shown in FIG. 5, the cam disc 74 has a lobe 76, which interengages with a cam follower arm 78, itself urged in one direction by spring 80.

As cam disc 74 completes one revolution, the lobe 76 will first bear on one portion of arm 78 and then the opposite portion of arm 78, thereby producing a positive rocking motion in both directions.

The free end of arm 78 is attached to housing 82, which in turn contains a moveable drive tooth 84, provided on a spring 86.

Tooth 84 is provided with a diagonally formed surface on its free end, and on its other end, is provided with a manually operable pin 88. As best shown in FIGS. 7a and 7b, by means of the pin 88, the tooth 84 may be rotated so as to bring its diagonal surface into two different positions.

A tranverse guide pin 90, riding in slot 92 (FIG. 6) ensures that the tooth 84 remains in its selected position.

Tooth housing 82 is mounted by means of bracket 94 on a mounting sleeve 96 which is itself rotatably carried on sleeve 60, so that it may rotate to and fro relative to sleeve 60.

It will thus be seen that the entire assembly of the tooth 84, housing 82 and arm 78 will rotate about the centre of screw shaft 56. Such rotation is procured by means of the lobe 76 of cam disc 74 driven by shaft 12.

By engagement of tooth 84 with the gear 66, an incremental stepwise rotation of internally threaded sleeve 60 is procured, thereby gradually incrementally moving the screwshaft 56.

Direction of rotation of the gear 66 can be reversed simply by means of reversing the tooth 84 as shown in FIG. 7a and 7b.

Preferably, some restraint will be applied to the internally threaded sleeve 60 so that it cannot move freely in both directions. Such restraint may be provided frictionally, by means of pressure screw 98, which simply bears on the exterior of sleeve 60, or alternatively may be provided by any other incremental braking or restraining mechanism such as a pawl, or ratchet mechanism (not shown) the nature of which will be self-evident to persons skilled in the art.

The mechanism for rotating the tool bar 12 is best shown in FIG. 9.

As is shown in FIG. 9, the housing 10 contains two bearings 100, which rotatably support a drive sleeve 102. Drive sleeve 102 receives tool bar 12 within it, and makes a good sliding fit therewith. Tool bar 12 is provided with an axial longitudinal groove or slot 104, and a drive key 106 is attached by any suitable means such as a bolt to drive sleeve 102, and rides in the groove 104.

Drive sleeve 102 extends upwardly above housing 10, and provides a mounting for the drive pulleys 18.

It will thus be seen that rotation of pulleys 18 will rotate housing 102, and key 106 riding in groove 104 will thus cause tool bar 12 to rotate. However, tool bar 12 is still free to slide axially through sleeve 102 even while it is being driven.

Suitable bearings or bushings 108 are provided in the lower end of housing 10, at neck 38, and the entire bearing and sleeve assembly is held in housing 10 by means of a retaining ring 110. Ring 110 is removable, so as to permit the entire assembly to be withdrawn for servicing.

Different work pieces and different machining operations are permitted by means of a variety of different base structures. Thus FIG. 10 shows a variation in the base structure, which comprises a support ring 112, and at least two angled legs 114, provided with feet 116 which may be bolted either by bolts 117, or as shown in FIG. 11, or otherwise clamped in position on a work piece. A centering ring 118 is formed on the upper surface of support 112, for providing support for the clamping ring 36 described above.

FIG. 11 shows a further variation, comprising a modified form of clamping ring 120, cut-away 122, and mounted directly on a foot portion 124.

Also illustrated in FIG. 11 is a means of clamping and levelling the foot portion 124, which may also be applicable to feet 32 or 116 described above or to other mounting structures described below. This clamping mechanism comprises a nut 126 which is welded directly to the work piece W, and a stud 128 which passes through a suitable opening in the foot 124, and is secured in nut 126. Final clamping or levelling of the foot 124 may be achieved by tightening down bolts 130. In this way, it is possible in fact to clamp foot 124 firmly against a work piece, or alternatively to set it at a predetermined angle where it is still clamped firmly in position.

Clearly, the angular variation will not be great, unless the size of the opening (not shown) in the foot 124 through which stud 128 is passed is considerably oversize.

In order to provide for machining operations at a greater angle, the support as shown in FIG. 12 is used. In this case a support bar 132, having legs 134 at either end, provided with feet 136. Located centrally of bar 132, is a movable bushing 138 located in a clamping collar 140. Collar 140 is in turn clamped by means of a set screw 142.

Collar 140 is split, and is provided with a concave interior radius, and bearing 138 is provided with a convex exterior radius, whereby when the set screw 142 is loosened off the bearing or bushing 138 may be swung between relatively wide angles, and then tightened up and held in a predetermined position by tightening the set screw 142.

Where certain machining operations are carried out using a longer tool bar 12, then it may be necessary to provide additional support for the tool bar 12 along its length.

Figure 15:
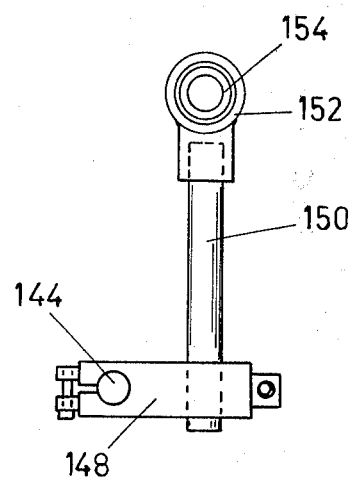
FIG. 15 is a top plan view of the embodiment of FIG. 14.

Such an additional support is shown in FIGS. 14 and 15. It comprises a post 144, having movable clamping arms 146 adjustably located thereon, and adapted to be clamped to any suitable portion of the work piece by means of bolts or other means.

In order to support the tool bar 12, a support arm 148 is movably clamped to the other end of post 144, and in turn carries a further post 150 therein. On the free end of post 150, there is located a bushing housing 152 carrying a bushing 154, which is adjustably mounted therein in the same manner as bushing 138 in FIG. 12.

In order to provide for certain other machining operations particularly in awkward locations, a right-angle drive may be provided, by means of the bevelled gears 156 and 158. The bevel gear 156 is mounted in a modified form of drive housing 160, and drives a modified drive sleeve 162, driving a tool bar 12 and tool holder 14.

The bevel gear 158 is mounted on the end of a further right-angle drive shaft 164, which may be driven by any suitable means such as a drive housing and drive assembly shown generally as 10, similar to that used in FIG. 1.

In operation, the base plate 30 may be clamped or fastened by means of feet 32, using any suitable form of metal clamps such as are well known in the art, or alternatively using any one of the systems described in connection with FIGS. 10 and 11, onto a work piece.

Collar 36 may then be fastened to base 30, by means of bolts 42. The neck 38 may then be inserted, and clamped and bolt 37 tightened up clamping neck 38 in position. A suitable tool holder 14 and tool bit 16 are attached at the lower end of drive shaft 12. By suitable rotation of hand wheel 70 and gear 68, shaft 12 may be advanced towards the work piece. By the operation of pin 88, tooth 84 may be set to procure advancement of shaft 12 in predetermined increments.

The motor 20 may then be operated, causing rotation of pulley wheels 18, thereby causing continuous rotation of the shaft 12. Tool bit 16 will then commence cutting the workpiece. Each complete revolution of shaft 12 will cause one complete revolution of cam 76. This will cause a forward and back rocking motion of arm 78. This in turn will cause a semi-rotational movement of tooth housing 82 as shown in FIG. 8, thereby procuring a predetermined incremental semi-rotation of advancing screw shaft 56. This in turn will cause sleeve 54 to advance by a predetermined distance down shaft 56. This in turn will cause housing 44 to force drive shaft 12 downwardly by a predetermined increment.

In this description, the word downwardly is used in reference to the illustration of the device as shown in FIG. 1. It will of course be appreciated that downwardly simply means forcing the shaft 12 through the housing 10. The entire apparatus can of course be set up to carry out machining operations in any particular orientation, and the word downwardly has not been intended to limit any particular movement.

In this way, machining can take place continuously and automatically simply by continuing rotation of the motor 20.

When machining has been completed, the motor 20 may be stopped, and the shaft 12 may be withdrawn simply by re-engaging gear 68 and operating hand wheel 70 in the opposite direction.

Clearly, the different mounting bases shown for example in FIGS. 11, 11 and 12, may be employed in various different situations in essentially the same manner.

When it is required to tilt the mounting base, this can be done either by the use of shims (not shown) or by the operation of bolts such as bolts 117, or by the manner shown in FIG. 11. As shown in FIG. 11, the foot portion 124 can be tilted, by simply loosening off the nut 128, and tightening down one or more of the bolts 130.

The same system is equally applicable to the feet 32 of FIG. 1, or 116 of FIG. 10, or 136 of FIG. 12.

If extended support of shaft 12 is required, then such support can be provided by the means shown in FIGS. 14 and 15, the shaft passing through the bearing 154. The bearing 154 can be set up in any orientation or position which is suitable on the work piece. If desired, several such supports can be employed at intervals along an extended shaft 12.

Figure 16:
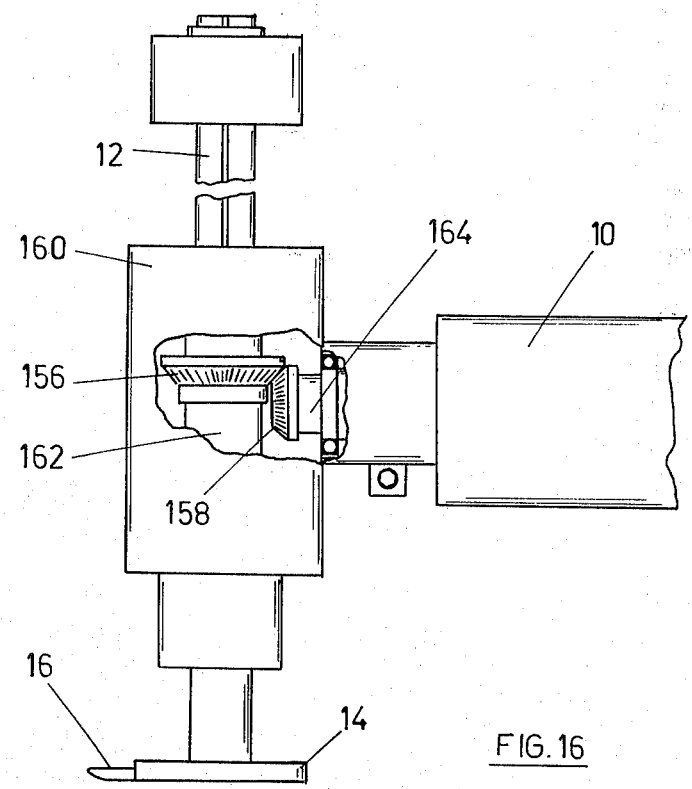
FIG. 16 shows an alternate form of drive mechanism for the machining bar.

In certain locations it may be desirable to employ a right-angle drive as shown in FIG. 16, with the motor 20 and housing 10 being offset to one side of the shaft 12 at right angles.

It will thus be appreciated that a variety of different machining operations can be carried out, such as line boring, boring out old bearings, and even milling and lathe work, simply by the use of for example a different tool holder or cutting head 14, such as is well known in the art.

Having described what is believed to be the best mode by which the invention may be performed, it will be seen that the invention may be particularly defined as follows:

Dismountable machining apparatus for the precision machining of a workpiece, said apparatus being dismountable and removable, for operation at a variety of different work site locations, said apparatus comprising, base means having at least one foot member releasably attachable at a location for the desired machining operation, and further having a collar portion, said holder portion including an opening having a predetermined central axis and further having attachment means, drive housing means having connecting means releaseably interengageable with said attachment means, and defining a central opening in registration with said central opening of said holder portion, whereby said drive housing means may be assembled and disassembled from said base member at a work site, drive sleeve means in said drive housing means, rotatably mounted therein by suitable bearing means, and incorporating a central bore through said sleeve means, drive transmission means operatively connected to said drive sleeve means, and adapted to be coupled to a suitable power source, for driving said drive sleeve means, auxiliary drive means, operatively connected to said drive sleeve means, and driven in unison therewith, a machining bar member slidably received within said drive sleeve means and driveably interengageable within said sleeve means, whereby said machining bar member may be rotatably driven by said drive sleeve means, and may be axially slid therein, and being releasable therefrom for shipping to and from a work site, feed housing means and a feed sleeve member mounted in said feed housing means and supported by suitable bearing means for rotation therein, said feed sleeve member defining a central bore adapted to receive said machining bar member therein, and fastening means for fixing said machining bar member therein whereby said feed sleeve member rotates therewith in unison, a feed connecting member extending to one side of said feed housing means, feed screw means operatively connected with said feed connecting member and a feed screw advancing mechanism, connected to said feed screw means, and being operated by said auxiliary drive means whereby said feed screw means may cause axial lengthwise movement of said feed housing means and thus of said machining bar member within said feed sleeve member, and tool bit mounting means adapted to receive a suitable tool bit and releasably fastenable at one end of said machining bar member.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. Dismountable machining apparatus for the precision machining of a workpiece, said apparatus being dismountable and removable, for operation at a variety of different work site locations, said apparatus comprising:

base means having at least one foot member releasably attachable at a location for the desired machining operation, and further having a holder portion, said holder portion including a central opening having a predetermined central axis and further having attachment means;

drive housing means, having connecting means releasably interengageable with said attachment means, and defining a through opening in registration with said central opening of said holder portion, whereby said drive housing means may be assembled and disassembled from said base member at a work site;

drive sleeve means in said drive housing means rotatably mounted therein by suitable bearing means, and incorporating a central bore through said sleeve means;

drive transmission means operatively connected to said drive sleeve means, and adapted to be coupled to a suitable power source, for driving said drive sleeve means;

auxiliary drive means, operatively connected to said drive sleeve means, and driven in unison therewith;

a machining bar member slidably received within said drive sleeve means, and driveably interengageable within said sleeve means, whereby said machining bar member may be rotatably driven by said drive sleeve means, and may be axially slid therein, and being releasable therefrom for shipping to and from a work site;

feed housing means an a feed sleeve member mounted in said feed housing means and supported by suitable bearing means for rotation therein, said feed sleeve member defining a central bore adapted to receive said machining bar member therein, and fastening means for fixing said machining bar member therein whereby said feed sleeve member rotates therewith in unison;

a feed connecting member extending to one side of said feed housing means;

feed screw means operatively connected with said feed connecting member and a feed screw advancing mechanism connected to said feed screw means, and means coupled to said auxiliary drive means whereby said feed screw means may cause axial lengthwise movement of said feed housing means and thus of said machining bar member within said feed sleeve member, and, tool bit mounting means adapted to receive a suitable tool bit and releasably fastenable at one end of said machining bar member.

2. Dismountable machining apparatus as claimed in claim 1, wherein said base means comprises a base plate member, and at least two said foot members, and wherein said holder portion comprises a holder base, attachable to said base plate, and a collar connected thereto and means for tightening said collar.

3. Dismountable machining apparatus as claimed in claim 2, wherein said drive housing incorporates an attachment neck at one end thereof comprising said connecting means, releaseably interengageable with said collar.

4. Dismountable machining apparatus as claimed in claim 3 wherein said drive sleeve means comprises an elongated generally cylindrical sleeve, having a portion received within said driving housing, and a further portion extending therefrom, and including bearing means within said drive housing, for mounting said sleeve portion therein, and further including rotational drive means mounted on the exterior of said further sleeve portion extending from said housing, whereby said sleeve may be rotated by said power source.

5. Dismountable machining apparatus as claimed in claim 4 wherein said machining bar member is of elongated generally cylindrical shape, and including keyway means formed along the length of said machining bar member, and drive key means in said sleeve engaging said keyway, whereby said machining bar member may be rotatably driven by said drive sleeve, while being axially slidable therein.

6. Dismountable machining apparatus as claimed in claim 1 wherein said auxiliary drive means includes incremental drive means for driving said feed screw means intermittently, during continuous operation of said machining bar member, whereby to procure intermittent incremental axial movement of said machining bar member, during continuous rotation thereof.

7. Dismountable machining apparatus as claimed in claim 6 wherein said feed screw means comprises a threaded bar member, a drive sleeve keyed thereto, drive gear means on said sleeve member, and wherein said incremental drive means further includes a releasing means which allows it to be releasably interengageable with said drive gear means, whereby to procure intermittent step-wise rotation thereof in timed relation to the rotation of said machining bar.

8. Dismountable machining apparatus as claimed in claim 7, wherein said drive transmission means comprises a tooth member carried in a housing, means rotatably mounting said housing, for step-wise rotation around said threaded bar, and spring means in said housing, urging said tooth member into engagement with said gear, for rotation of said gear in one direction, said housing being rotatable in the other direction, with said spring means yielding to permit said tooth member to disengage from said gear.

9. Dismountable machining apparatus as claimed in claim 8, wherein said auxiliary drive means comprises cam means mounted on said drive sleeve, and rotatable in unison with said machining bar, cam follower means riding on said cam, and operable thereby to rock to and fro upon rotation thereof, and, means connecting said cam follower means to said tooth housing, whereby to procure a rocking to and fro movement thereof.

* * * * *